United States Patent [19]
Foladare et al.

[11] Patent Number: 5,950,122
[45] Date of Patent: Sep. 7, 1999

[54] TECHNIQUE FOR PROVIDING FEATURE INFORMATION IN A PERSONAL MOBILE COMMUNICATION SYSTEM

[75] Inventors: Mark J. Foladare, Kendall Park; David P. Silverman, Somerville; Shelley B. Goldman, East Brunswick; Roy P. Weber, Bridgewater, all of N.J.

[73] Assignee: At & T Corp, Middletown, N.J.

[21] Appl. No.: 08/639,051

[22] Filed: Apr. 24, 1996

[51] Int. Cl.⁶ .............. H04Q 7/06; H04Q 7/10; H04Q 7/12; H04Q 7/32

[52] U.S. Cl. .......... 455/414; 455/459; 455/412; 455/403; 455/31.3; 455/31.2

[58] Field of Search .............. 455/31.3, 31.2, 455/403, 412, 413, 414, 459, 415, 416, 426, 458; 379/67, 88, 89; 340/825.44, 825.47, 825.49

[56] References Cited

U.S. PATENT DOCUMENTS

| | | |
|---|---|---|
| 5,153,582 | 10/1992 | Davis .................. 340/825.44 |
| 5,307,399 | 4/1994 | Dai et al. ............... 455/31.3 |
| 5,311,570 | 5/1994 | Grimes et al. ........ 340/825.44 |
| 5,327,486 | 7/1994 | Wolff et al. ............ 455/412 |
| 5,375,161 | 12/1994 | Fuller et al. ........ 340/825.44 |
| 5,657,376 | 8/1997 | Espeut et al. ........... 455/459 |

*Primary Examiner*—Wellington Chin
*Assistant Examiner*—Keith Ferguson

[57] ABSTRACT

A method for use in completing a caller's telephone call that is placed to the telephone number of a called party, comprises the steps of receiving the caller's call, in response to which selecting a meet-me system from among a plurality of meet-me systems. The method further comprises the steps of routing the caller's call to the selected meet-me system, and, routing a call originated by said called party to this selected meet-me system so as to connect to the caller's call at the selected meet-me system. Thereafter, the method includes the step of transmitting appropriate instructions associated with a plurality of available features to the called party so as to allow the called party to select at least one of the available features.

22 Claims, 4 Drawing Sheets

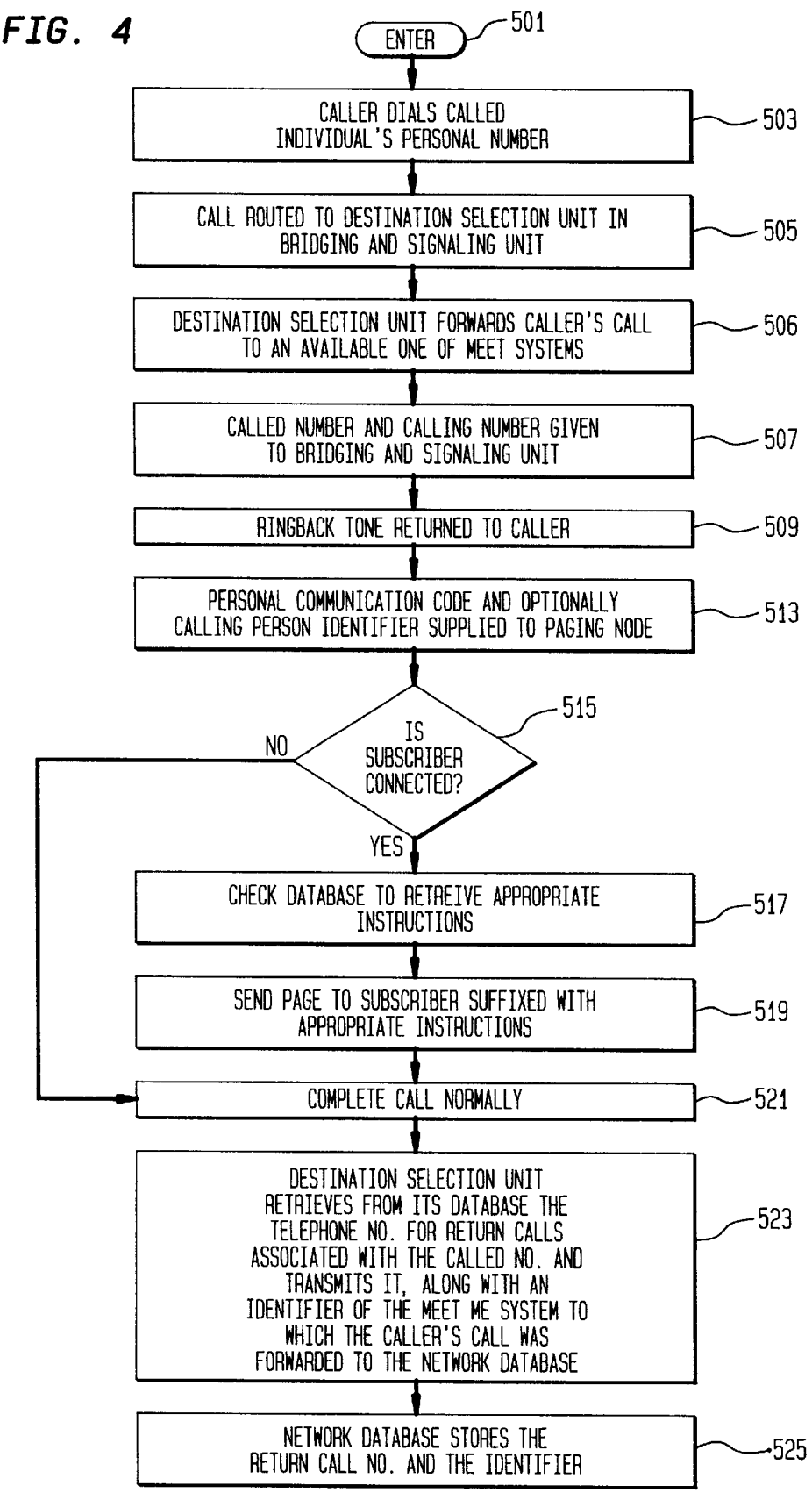

5,950,122

TECHNIQUE FOR PROVIDING FEATURE INFORMATION IN A PERSONAL MOBILE COMMUNICATION SYSTEM

FIELD OF THE INVENTION

This invention relates to personal communications and, more particularly, to systems for setting up communications between a caller and a called individual using a combination of paging and call bridging.

BACKGROUND OF THE INVENTION

A problem with setting up telecommunications connections is the difficulty of locating called individuals who are highly mobile. This problem is partially alleviated by mobile telephone technology and radio paging systems. In one prior art system, known as personal mobile communication system (PRS) described in copending application Ser. No. 08/138,887 assigned to the same assignee as the present application, in response to a telephone call from a caller, a telephone call, namely, the so-called "return call", is placed by a called individual to a meet-me bridge at which the caller's telephone call may be held for connection to the return telephone call.

Typically, personal communication systems include a bridging and signaling unit that contains several independent meet-me systems. Each meet-me system has at least 1) one meet-me bridge and 2) its own telephone trunks directly connecting it to the telephone network over which it receives return calls. Such meet-me systems are typically physically distinct, although each may be networked with its peers so as to be able to communicate information between them.

Recently, many personal communication systems provide various features that may be used by the called party. However, subscribers tend to forget all the features that are available in their system. Furthermore, many subscribers also forget how to implement a feature, even if they are aware of its availability. Thus there is a need to make available to such subscribers all available features on their personal communication system, while they are using the system.

SUMMARY OF THE INVENTION

To overcome this problem, in accordance with the principles of the invention, each time a caller's call is routed to a meet-me system, the bridge and signaling unit determines the status of the subscriber and sends applicable instructions to the subscriber that may be displayed on an alphanumeric display. The subscriber may employ one of the applicable instructions, without the need to remember the actual sequence of instructions that are necessary to implement an available feature.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects and advantages thereof may best be understood by reference to the following detailed description when read with the accompanying drawings in which:

FIG. 4 shows a flow chart of an exemplary process for providing available features to a subscriber in accordance with the present invention.

DETAILED DESCRIPTION OF THE INVENTION

Figure 1:
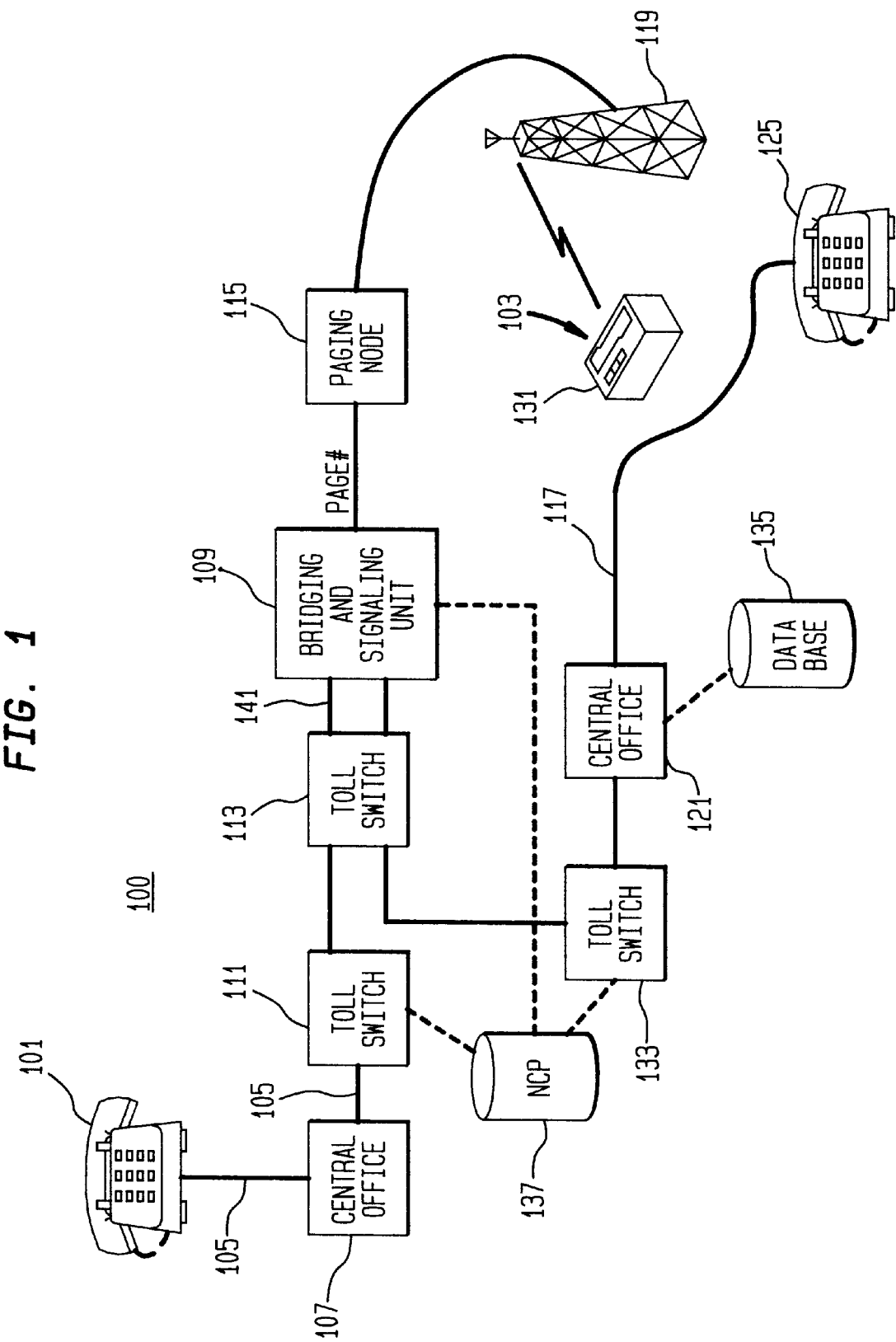
FIG. 1 shows an arrangement for providing telecommunications services, in accordance with the present invention.

FIG. 1 shows arrangement 100 for providing telecommunications services, in accordance with the principles of the invention. A caller places a telephone call from calling telephone 101 to the personal telephone number of an individual associated with pager 103. The caller's telephone call passes over telephone line 105 to central office 107. Central office 107, in turn, routes the call to bridging and signaling unit 109, which is associated with the called number. This is done in the conventional manner. As shown, the caller's telephone call is routed by toll switch 111 through toll switch 113, which is connected to bridging and signaling unit 109. Pager 103 is also associated with the called personal telephone number, as discussed further below.

Bridging and signaling unit 109 implements a plurality of so called meet-me bridges each of which is for connecting at least two incoming telephone calls to each other. Upon receipt of the caller's telephone call, bridging and signaling unit 109 forwards paging information to paging node 115. The paging information includes a predetermined code that uniquely identifies the called individual's pager 103. A copy of the predetermined code is stored within pager 103.

Advantageously, each meet-me bridge is assigned to establish telephone communications for a predetermined set of subscribing pagers. Thus, all calls intended for a predetermined set of pagers may be handled by a particularly assigned meet-me bridge. Paging node 115 causes a paging signal containing the paging information to be broadcast from paging tower 119. Pagers and paging systems are well known in the art. It is noted that although the embodiment described herein employs a plurality of meet-me bridges, the invention is not limited in scope in this respect. For example, any telecommunications node that is able to handle calls routed from a caller or a called person may be employed in accordance with the present invention.

Pager 103 receives paging signals transmitted from paging tower 119. In the event that the code contained within the paging information of a paging signal matches the predetermined code stored in pager 103, pager 103 alerts. In response to the alerting by pager 103, the subscriber of pager 103 places a telephone call, which is the so-called "return call", from telephone 125 to a particular predetermined telephone number. Such a return call may be automatically placed if pager 103 and telephone 125 are incorporated into a single device. As such, central office 121 receives the return telephone call and routes it to bridging and signaling unit 109 for connection to the caller's telephone call. To this end, central office 121 routes the return call to toll switch 133, e.g., of an inter-exchange carrier.

The telephone number of the return telephone call is translatable, i.e., a data base lookup may be performed to determine the routing telephone number to which the call is actually completed, e.g., an 800-type of telephone number. An advantage of using an 800-type of telephone number is that it allows the owner of pager 103 to place the return telephone call without having any information about the area code of the telephone line which he is using. The association of central office 121 with database 135 is for the central office to know to which inter-exchange carrier to route the call. The use by toll switch 133 of database 137 is to direct the routing process from toll switch 133 to the local exchange carrier represented by central office 113.

As mentioned above, pager 103 alerts the called individual to the existence of a telephone call placed to his personal number upon an indication that the call from calling telephone 101 remains in progress. To this end, upon receipt of the return connection, bridging and signaling unit 109 continually determines if the call from telephone 101 remains in progress. Bridging and signaling unit 109 may send data information to pager 103 that provides additional guidance and instructions to the subscriber as to available options or features that the subscriber desires to employ. It is noted that such instructions may be sent by any telecommunications node that is employed to handle such calls from a plurality of callers to subscribers who use pager 103.

For example, when pager 103 alerts the subscriber, it may also display further instructions as to what the customer can do. One such instruction may be a request to the subscriber to go to the nearest phone such as phone 125 and dial the number that appears on the display. Another instruction may relate to a forwarding feature. Such instruction may be a request to dial a sequence of additional numbers immediately after dialing the number on the display to direct the calling party to an alternate destination, such as a voice mail or a forwarding telephone number.

It is noted that pager 103 may be a two way pager, which allows the subscriber to transmit data in addition to receiving data. For such two way pagers, bridging and signaling unit 109 in addition to alerting the pager, may also transmit a list of instructions associated with available features in the system. This list may then be displayed on the subscriber's pager display. The subscriber may then select one of the instructions displayed and transmit the selected instruction via the pager. These instructions may include requests to press certain codes to forward the caller's call to an alternative destination, such as a voice mail, or another person such as the subscriber's assistant.

According to another aspect of the invention, while the call generated by a first caller is still in progress, and the called party and the first caller have established a telephone connection at a predetermined meet-me bridge, a second caller may attempt to reach the same pager 103 subscriber. Thus, upon receipt of the second caller's telephone call, bridging and signaling unit 109 forwards paging information and additional information representing applicable instructions to paging node 115, which relate to a switching-calls feature as explained below.

Paging node 115 causes a paging signal containing the paging information and information relating to applicable instructions to be broadcast from paging tower 119. For example, the called party may receive an instruction on the pager's display such as "PRESS *S FOR SWITCH." When the called party follows this instruction, the assigned meet-me bridge system preferably holds the first call, and establishes communication between the subscriber and the second caller. The called party may then switch between the first and second callers as long as they are both connected to the same meet-me system. It is noted that the meet-me bridge may handle more than two phone calls at the same time. Thus, signaling unit 109 may also send instructions to the subscriber for handling many calls at the same time.

Another example of applicable instructions relates to a conferencing feature. Such instruction may be "PRESS *C TO CONFERENCE," which may be employed when the called party desires to conference two or more callers. In response to this exemplary *C command, bridging and signaling unit 109 establishes a conference call among the return call from the called party and the callers at a predetermined meet-me bridge.

Another applicable instruction may be "PRESS *H TO SWITCH PHONES FROM MOBILE TO LINE." This instruction allows the called party to switch phones, for example from a mobile phone to a line phone while communicating with a caller via a predetermined meet-me bridge. The caller's telephone call may be held for connection, while the called party picks up a line phone and dials a predetermined number. This leads to a return call to the meet-me bridge and a new connection with the caller.

It will be appreciated that there may be numerous situations where applicable instructions may be employed based on the available features on the system. These instructions may all be transmitted for the subscriber's viewing and guidance to select a particular feature. Thus, the invention is not limited in scope to any particular situation or feature.

Figure 2:
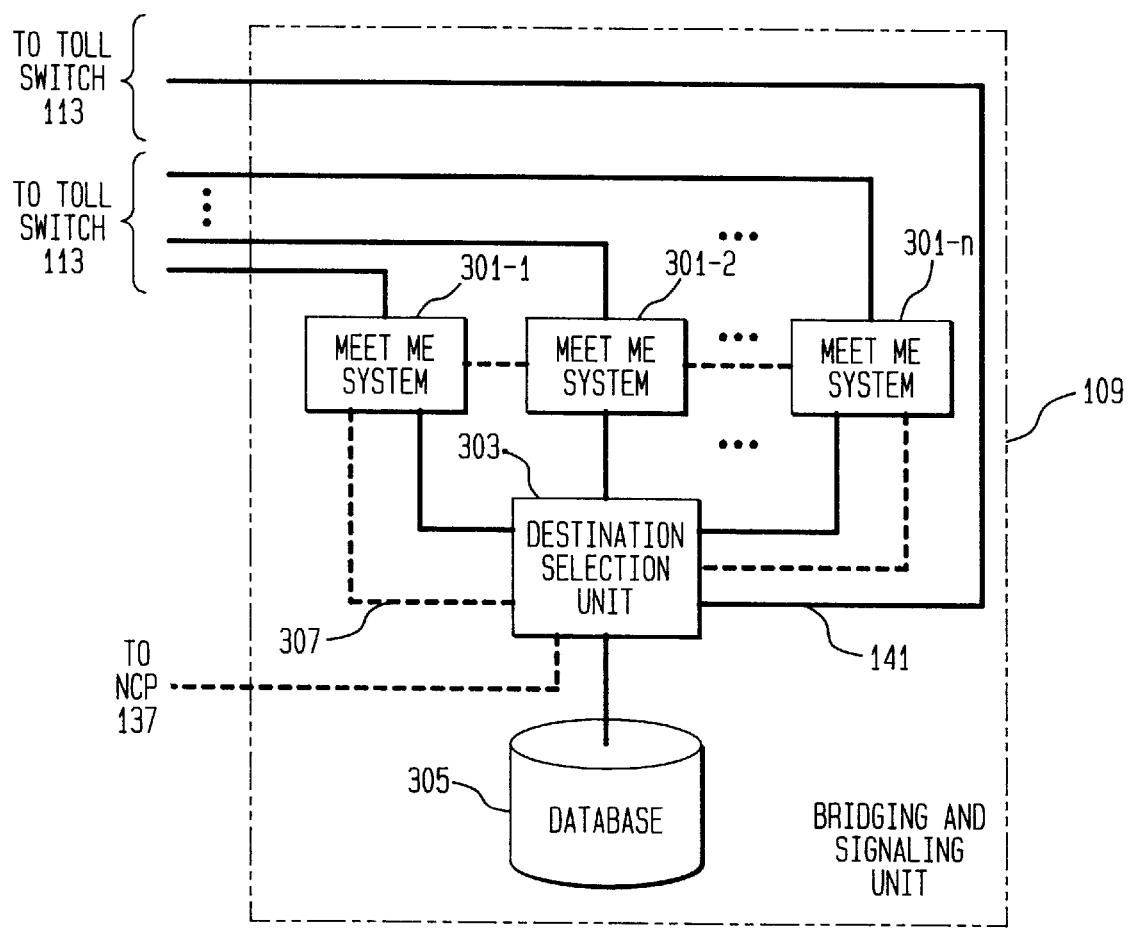
FIG. 2 shows, in block diagram form, an expanded view of the bridging and signaling unit shown in FIG. 1.

FIG. 2 shows, in block diagram form, an expanded view of an exemplary bridging and signaling unit 109. As shown, bridging and signaling unit 109 includes a) meet-me systems 301, which includes meet-me system 301-1 to 301-n, b) destination selection unit 303, and c) data base 305. Each meet-me system 301 implements within itself at least one meet-me bridge. Also, each meet-me system 301 has its own telephone trunks which connect it to the telephone network via toll switch 113. Meet-me systems 301 are physically distinct, although they are each connected via local area network 307. Local area network 307 also connects meet-me systems 301 to destination selection unit 303. It is noted that local area network 307 may be replaced by a wide area network, so that meet-me systems 301 may each be geographically diverse. Destination selection unit 303 is connected by at least one telephone trunk 141 to toll switch 113. Destination selection unit 303 is also connected by telephone circuits to each of meet-me systems 301 so that it can forward each call received from a caller over trunk 141 to one of meet-me systems 301. For example, destination selection unit 303 may be a specially programmed switch or PBX.

Figure 3:
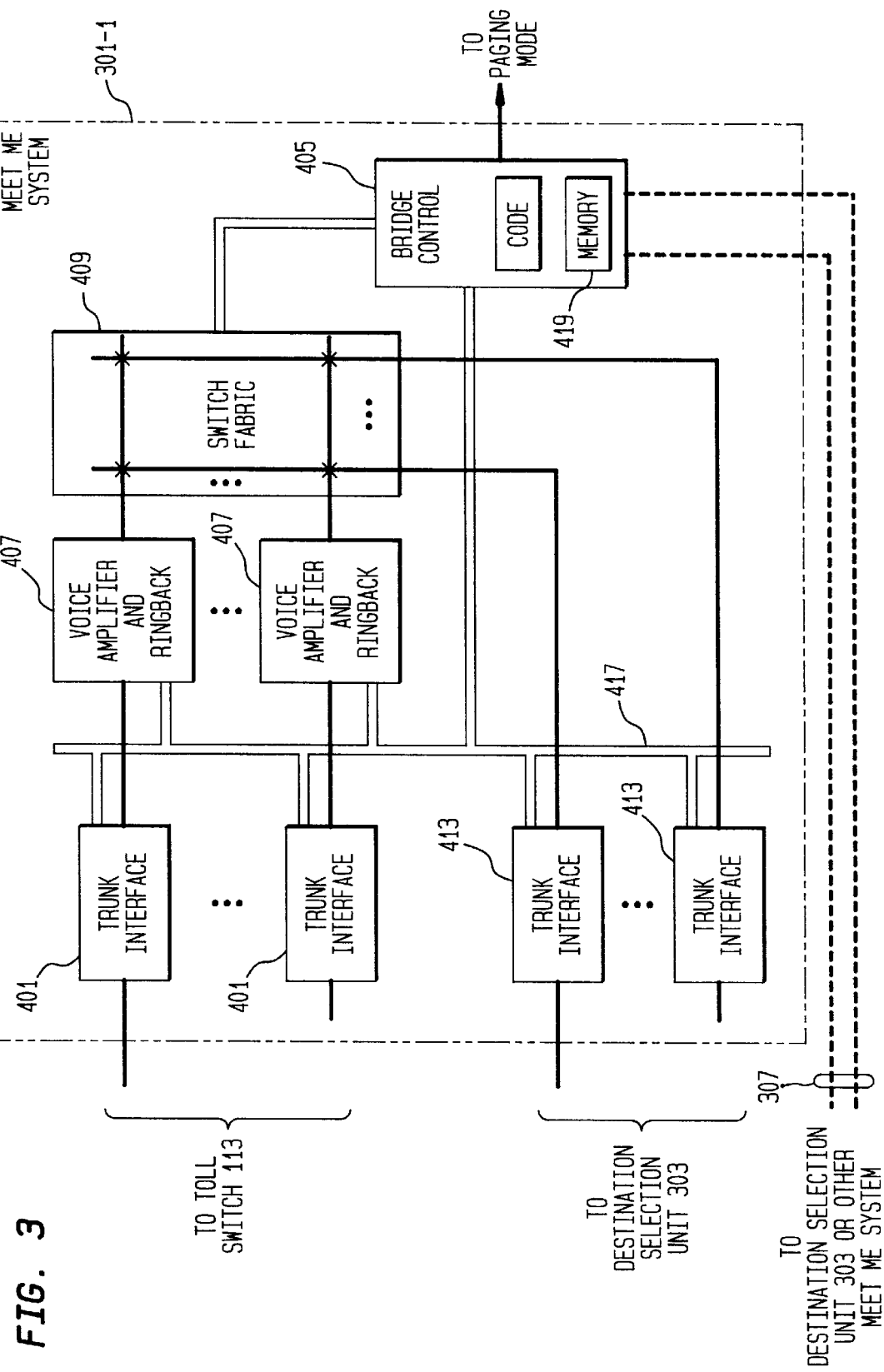
FIG. 3 shows, in block diagram form, an expanded view of one of the meet-me systems shown in FIG. 2.

FIG. 3 shows, in block diagram form, an expanded view of meet-me system 301-1. Meet-me system 301-1 includes: a) trunk interfaces 401, b) bridge control 405, c) voice amplifier and ringback units 407, d) switch fabric 409, and e) trunk interfaces 413. Bridge control 405 controls and coordinates the operation of meet-me system 301-1 by communicating commands and information over control bus 417. Bridge control 405 communicates via LAN 307 with the others of meet-me systems 301 and destination selection unit 303 (FIG. 2). In one embodiment, trunk interfaces 401 and 413 are T-1 or ISDN primary rate interfaces (PRI). The design of such trunk interfaces is well known in the art. Also, embodiments of the invention can include the processing of both in-band and out-of-band signals.

A call placed by a caller to the personal number of an individual associated with pager 103 (FIG. 1) is received at destination selection unit 303 (FIG. 2). In the exemplary embodiment of the invention, destination selection unit 303 obtains the telephone number that was dialed by the caller, e.g., over a signaling channel on trunk 141. However, it will be recognized that in other embodiments of the invention the telephone number may be obtained using in-band or out-of-band signaling. Destination selection unit 303 selects one of meet-me systems 301 to handle the call and connects the call through itself to the selected one of meet-me system 301. One of the meet-me systems 301 must be operational and have an available meet-me bridge to be selected. The telephone number that was dialed by the caller is supplied by destination selection unit 303 to the selected one of meet-me systems 301, via LAN 307. Alternatively, the dialed telephone number may be supplied over the connection from destination selection unit 303 to the selected one of meet-me units 301 via one of trunk interfaces 401.

Upon receiving an incoming call from a caller at one of meet-me systems 301, the meet-me system's bridge control 405 instructs one of voice amplifier and audible ring units 407 to supply ringback tone to the caller via the one of trunk interfaces 401 at which the call arrived. Answer supervision may be supplied so that an optional personal identification number (PIN) may be received from the caller. Such a PIN is detected by trunk interface 401 and forwarded to bridge control 405. This optional PIN may be transmitted to pager 103 as part of the calling information.

Bridge control 405 contains memory 419. Memory 419 maps the received digits of the called individual's personal telephone number to the predetermined code stored in the pager 103 associated with the called individual. Memory 419 also stores a list of available features of the system along with applicable instructions that need be dialed to employ each feature. Thereafter, bridge control 405 supplies to paging node 115 (FIG. 1) the telephone number of the predetermined code of the called individual, and information representing applicable instructions for display on pager 103.

Destination selection unit 303 retrieves from data base 305 a telephone number that was associated with the called telephone number and to which the return call, if any, will be placed for the called telephone number. Table 1 is an exemplary destination selection unit record stored in destination selection unit 303. Table 1 shows the association of a) the called party's telephone number, which is dialed by the calling party, b) the telephone number to which the called party will place a return call to meet the calling party, and c) the telephone number of the one of meet-me systems 301 which was last selected for use by a call to the called party's telephone number.

TABLE 1

Destination Selection Unit Record

| Called Party's Number | Return Call Number | Meet-Me System Identifier |
|---|---|---|
| 800-555-1234 | 800-555-1235 | 555-631-6167 (meet-me system 301-1) |
| 800-555-7209 | 800-555-7210 | 555-631-8888 (meet-me system 301-2) |

The retrieved associated return call telephone number is transmitted to network data base 137, e.g., via a signaling network connection, along with an identifier of the meet-me system to which the caller's call was forwarded by destination selection unit 303. An example of network database 137 is the well known network control point (NCP). The identifier of the meet-me system to which the caller's call was forwarded may be a particular trunk identifier that terminates at the meet-me system. Network data base 137 stores the return call telephone number and the meet-me system identifier in association, for example, as shown in Table 2, so that when a call placed to the return call telephone number is received at a toll switch, it is routed directly to the meet-me system to which the caller's call was forwarded by destination selection unit 303, i.e., without passing through destination selection unit 303, in accordance with the principles of the invention.

TABLE 2

Network Database Record

| Translatable Number | Routing Telephone Number | Explanation (not stored) |
|---|---|---|
| 800-555-1234 | 908-658-2020 | destination selection unit 303 |
| 800-555-1235 | 555-631-6167 | trunk identifying meet-me system |
| 800-555-1236 | 908-949-3179 | 301-1 non-personal translatable telephone number |

Upon receipt of a return telephone call at one of trunk interfaces 413 of the selected one of meet-me units 301, bridge control 405 determines from the dialed telephone numbers at which of trunk interfaces 401 is waiting the call of the caller that corresponds to this return telephone call. If the caller's telephone call is still waiting at one of trunk interfaces 401, bridge control 405 commands switch fabric 409 to interconnect the caller's telephone call at one of trunk interfaces 401 with its respective return telephone call at one of trunk interfaces 413. Bridge control 405 also commands the respective one of voice amplifier and ringback units 407 to cease supplying ringback tone to the caller and to switch to amplification mode. This is necessary because a back-to-back connection of two separate telephone calls requires amplification to overcome the attendant loss of signal strength. It is noted that the calls described herein, in which the called party is paged and must place a return telephone call to be connected to the calling party, are known as "revertive calls". Bridge control 405 also monitors predetermined codes received from the called party that may relate to a desired feature available in the system. Upon detection of a predetermined code, bridge control 405 controls switch fabric 409 to implement the desired feature.

It is noted that the structure of a meet-me system shown FIG. 3, with different instructions stored in the code section of bridge control 405 can also be used to implement destination selection unit 303. In such an embodiment, trunk interfaces 401 would still be connected to toll switch 113, but trunk interfaces 413 would be connected to the other meet-me systems. Given the description herein, such an embodiment of the invention will be obvious to one of ordinary skill in the art.

FIG. 4 shows a flow chart of an exemplary process for completing a telephone call placed to the personal number of a called individual associated with pager 103 (FIG. 1), in accordance with the principles of the invention. The process begins in step 501 (FIG. 3) when a caller decides to make a call to the individual associated with pager 103 using his personal number. To this end, in step 503, the caller dials the called individual's personal number at telephone 101 (FIG. 1). A telecommunications carrier routes the call to destination selection unit 303 of bridging and signaling unit 109 in step 505. This is achieved by programming data base 137 to route all calls to personal telephone numbers used by subscribers of such a personal reach service to destination selection unit 303.

In step 506, destination selection unit 303 forwards the caller's call to one of meet-me systems 301. The particular process for selecting a meet-me system to route the caller's call to is at the discretion of the implementor. However, it is required that the selected meet-me system be functioning and have available capacity. Those skilled in the art will be able to readily develop such a selection process. Hereinafter, it is assumed that an exemplary first call is routed to meet-me system 301-1. Thereafter, in step 507, the telecommunications carrier supplies the calling number and, if available, an identifier of the calling person, e.g., the calling number or a personal identification number (PIN), to destination selection unit 303. Destination selection unit 303 stores this information and also forwards it via LAN/WAN 307 to the selected one of meet-me systems 301.

In step 509, meet-me system 301-1 supplies ringback tone to telephone 101. Next, in step 513, meet-me system 301-1 sends to paging node 115 the paging information, i.e., the predetermined code of the called individual that is stored within pager 103, and optionally, an indication of the identity of the caller, in step 513. Next in step 515 bridging and signaling unit 109 determines whether subscriber of pager 103 is already connected to switch fabric 409. If the subscriber is not connected, at step 521, the call is completed normally as described below.

If at step 515, it is determined that the subscriber of pager 103 is already connected to switch fabric 409, at step 517, bridge control 405 determines the status of the subscriber's call. Next, memory 419 is checked to retrieve the appropriate applicable instruction for the subscriber's use. At step 519, meet-me system 301-1 broadcasts to paging node 115 the retrieved applicable instructions for transmission along with paging information described in step 513. The system then completes the call normally at step 521 as described below.

At step 521, bridging and signaling unit 109 completes the call initiated by a caller. Thus, paging tower 119 broadcasts a paging signal that includes the paging information, in addition to any applicable instructions. Next, in step 523, destination selection unit 303 retrieves from data base 305 the telephone number for a return call that is associated with the called telephone number. At step 525, the retrieved associated return call telephone number is transmitted and stored in network data base 137, along with an identifier of the meet-me system to which the caller's call was forwarded by destination selection unit 303. The identifier of the meet-me system to which the caller's call was forwarded may be a particular trunk identifier that terminates at the meet-me system.

It is noted that the principles of the invention are applicable to other types of telephone calls as well, e.g., fax, data, video. Optionally, in accordance with an aspect of the invention, prior to selecting a meet-me system for each caller's call, destination selection unit 303 retrieves a record of which meet-me system handled the last call to the called party's number. If the destination selection unit 303 determines that the meet-me system indicated by the retrieved record is free, it forwards the call to that meet-me system. Furthermore, since network database 137 already has stored the return call telephone number associated with the selected meet-me system, no update of network database 137 is needed. Advantageously, utilization of the network resources is reduced.

It is noted that telephone 125 may be a mobile telephone station. If so, central office 121 is a mobile telephone switching office (MTSO). It is noted that the techniques of the invention may be applied where many of the called parties share a single telephone number to which they each place their return telephone calls, the ultimate meet-me systems to which the individual return calls are routed being determined by personal identification numbers (PINs), e.g., four digit numbers, that are supplied by the individual called parties to particularly identify themselves.

In such an application, destination selection unit 303 a) stores the expected PIN for the called party in association with the return call telephone number and b) supplies the PIN to network database 137 along with return call telephone number and the identifier of the meet-me system to which the caller's call was forwarded. Upon receipt of a call to the shared return telephone number, network database 137 forwards the return call to the one of meet-me systems identified by the shared return telephone number and having a stored PIN that matches a PIN received from the called party. The PIN may be obtained from the called party using well known techniques, such as those used to provide advanced 800 service.

In one embodiment of the invention, several calling parties may place calls to the same called party. In such a case, preferably, destination selection unit 303 routes each of the calling parties' calls to the same one of meet-me systems 301. Doing so permits the called party to select and/or switch between the various calling parties. In an alternative implementation, in response to signaling from the called party, destination signaling unit 303 can communicate with network database 137 to transfer the called party's return call between the meet-me systems 301 to which the calling parties' calls were routed, so as to connect the called party to the various calling parties.

It is also noted that in some embodiments of the invention, once a caller's call has been routed to the selected one of meet-me systems 301, the caller's call may be rerouted in the telephone network, using well known network rerouting techniques, so as to connect it directly to the selected one of meet-me systems 301 and thereby bypass destination selection unit 303. Doing so increases the number of calls that can be handled by bridging and signaling unit 109.

The foregoing merely illustrates the principles of the inventions. It will thus be appreciated that those skilled in the art will be able to devise various arrangements which, although not explicitly described or shown herein, embody the principles of the invention and are thus within its spirit and scope.

We claim:

1. A method for use in completing a caller's telephone call that is placed to the telephone number of a called party, the method comprising the steps of:
   receiving said caller's call;
   routing said caller's call to a telecommunications node;
   retrieving, from a memory, instructions associated with a plurality of telecommunications system features available to said called party;
   transmitting said instructions to said called party so as to allow said called party to select at least one of said available telecommunication system features.

2. The invention as defined in claim 1 wherein after said routing step the method further comprises the step of alerting said called party of said caller's call.

3. The invention as defined in claim 2, wherein after said transmitting step the method further comprises the step of said called party transmitting a signal corresponding to a selected feature so as to respond to said caller's call.

4. A method for use in completing a caller's telephone call that is placed to the telephone number of a called party, the method comprising the steps of:
   receiving said caller's call;
   in response to said call, routing said caller's call to a meet-me system;
   routing a call originated by said called party to said meet-me system;
   retrieving, from a memory, instructions associated with a plurality of telecommunications system features available to said called party; and transmitting said instructions to said called party so as to allow said called party to select at least one of said available telecommunication system features.

5. The invention as defined in claim 4, wherein after said receiving step the method further comprises the step of selecting a meet-me system from among a plurality of meet-me systems, and routing said caller's call to said selected meet-me system.

6. The invention as defined in claim 5 further comprising the steps of:
   routing at least a second caller's call intended for said called party to said selected meet-me system;
   transmitting one of said instructions to allow said called party to select one of said available telecommunication system features; and
   in response to a selected instruction routing a call originated by said called party to alternatively connect to said first caller and to said second caller.

7. The invention as defined in claim 6 further comprising the step of in response to a selected instruction routing a call originated by said called party to said first and second calling parties in a conference call.

8. The invention as defined in claim 6 further comprising the step of in response to a selected instruction by said called party, routing a call originated by said calling party to an alternate destination.

9. The invention as defined in claim 8 wherein said alternate destination is a voice mail system.

10. The invention as defined in claim 5 further comprising the steps of:
    in response to one of said selected instructions, putting on hold said calling party's call in said meet me system; and
    routing a second call originated by said called party to said meet-me system so as to connect again to said calling party.

11. The invention as defined in claim 10, wherein prior to said putting on hold step, said called party communicated to said meet-me system by a wireless terminal.

12. The invention as defined in claim 11, wherein said second call originated by said called party from a line telephone.

13. The invention as defined in claim 12, wherein said routing step further comprises the step of connecting calls originated by said calling parties to said call originating by said called party at a switch fabric disposed in said meet-me system.

14. The invention as defined in claim 13, wherein said instructions are stored in said meet-me system.

15. A method for use in completing a caller's telephone call that is placed to the telephone number of a called party, the method comprising the steps of:
    receiving said caller's call;
    in response to said call, selecting a meet-me system from among a plurality of meet-me systems;
    routing said caller's call to said selected meet-me system;
    alerting said called party of said caller's call;
    receiving a personal identification number (PIN) from said called party;
    in response to said personal identification number routing a call originated by said called party to said selected meet-me system so as to connect to said caller's call at said selected meet-me system;
    retrieving, from a memory, instructions associated with a plurality of telecommunications system features available to said called party; and transmitting said instructions to said called party so as to allow said called party to select at least one of said available telecommunication system features.

16. The invention as defined in claim 15, wherein prior to said step of transmitting appropriate instructions, the method further comprises the step of determining whether said called party has established a call to said meet-me system.

17. The invention as defined in claim 16, wherein after said step of determining the method further comprises the step of retrieving applicable instructions from a database, said database storing a set of applicable instructions associated with said available features.

18. Apparatus for use in completing a caller's telephone call to a called party, comprising:
    a plurality of networked meet-me systems;
    a destination selection unit for routing said caller's telephone call to a particular one of said meet-me systems;
    a communications unit for alerting said called party of said caller's telephone call and contemporaneously providing a plurality of instructions associated with a plurality of available features to said called party responsive to said caller's telephone call;
    a first database for causing a call originated by said called party for connection to said caller's call to be routed to said particular one of said meet-me systems; and
    a second database for storing said plurality of instructions associated with said plurality of available features for transmission to said communications unit associated with said called party so as to allow said called party to select at least one of said available features.

19. The invention as defined in claim 18, further comprising a call router so as to route said call originated by said called party to said particular one of said meet-me systems in response to the routing of said caller's call to said particular one of said meet-me systems.

20. Apparatus for use in completing a caller's telephone call to a called party, comprising:
    a plurality of networked meet-me systems;
    a destination selection unit for routing said caller's call to a particular one of said meet-me systems;
    a first database for causing a call originated by said called party for connection to said caller's call to be routed to said particular one of said meet-me systems;
    a second database for storing a plurality of instructions associated with a plurality of available features for transmission to said called party so as to allow said called party to select at least one of said available features, wherein said second database contains applicable instructions associated with a selection feature, said selection feature allowing said called party to select a caller's call from a plurality of callers' calls intended for said called party; and
    a call router so as to route said call originated by said called party to said particular one of said meet-me systems in response to the routing of said caller's call to said particular one of said meet-me systems.

21. The invention as defined in claim 20, wherein said database contains applicable instructions associated with a forwarding feature, said forwarding feature allowing said called party to route said caller's call to a predetermined destination.

22. The invention as defined in claim 21, wherein said database contains applicable instructions associated with a conferencing feature, said conferencing feature allowing said called party to conference a plurality of callers's calls together.

* * * * *